United States Patent Office 3,522,056
Patented July 28, 1970

3,522,056
REDUCTION OF STRONTIUM-90 CONTENT OF INTACT CEREAL GRAINS
Virgil F. Pfeifer and Roy A. Anderson, Peoria, Ill., assignors to the United States of America as represented by the Secretary of Agriculture
No Drawing. Filed Aug. 6, 1965, Ser. No. 477,983
Int. Cl. A23l 3/34
U.S. Cl. 99—80      3 Claims

ABSTRACT OF THE DISCLOSURE

Systemic incorporations of strontium-90 in unmilled cereal grain berries are lowered to negligible levels without attrition and without impairment of fractions in a subsequent milling thereof by washing the intact berries for several hours in a warmed dilute aqueous solution of citric acid or of phosphoric acid.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for removing most of the dangerously high amounts of strontium-90 that are found to be systemically present in intact cereal grains, mainly through rain-facilitated absorption of radioactive fallout and to a lesser extent through absorption by the roots.

More particularly, this invention relates to the chemical removal of radioactive materials including cesium 137 but especially the much more dangerous strontium-90 from unmilled wheat and other cereal grain berries.

The importance to humans of reducing the strontium-90 content of essential foods in preventing or minimizing bone marrow deposits capable of inducing cancer, e.g., leukemia, is fully recognized and has resulted, for example, in such removal from milk by treatment with ion exchange resins. However, the aqueous nature of milk lends itself to an ion exchange treatment and is in sharp contrast to the situation with intact cereal grains such as wheat that are to be milled, without appreciable loss of substance, into undamaged flours and related products.

Attempts to accomplish satisfactory reduction in the amount of incorporated radioactivity by means of scouring or by partial removal of the heavily contaminated hull have met with indifferent industrial success because treatments that are sufficiently drastic to remove the poorly accessible hull tissue defining the crease of the wheat berry also damages the bran and endosperm tissues with the result that upon milling there are obtained poorer yields of bran, and the quality of the flour is lowered by bran dust.

The principal object of our invention is the provision of an economical and highly effective process for markedly lowering the amount of radioactivity that is mainly localized in the hull layer of unmilled cereal grain berries without adversely affecting the yields and quality of bran and flour and related products subsequently milled therefrom.

A more specific object is the provision of a process for very substantially lowering the strontium-90 content of intact wheat kernels in a manner such that somewhat proportionate reductions in the levels of strontium-90 are found to characterize the bran and flours obtained on milling the grains that have been treated by our process.

Still another object is the provision of an atraumatic chemical treatment that does not cause the loss of kernel tissue but removes most of the incorporated strontium-90 from the intact wheat and other cereal grains so that relatively little strontium-90 is found in the bran and flours subsequently milled therefrom.

In accordance with the stated objects of our invention, we have now discovered that very extensive reductions in the systemic strontium-90 contents of intact wheat berries and products subsequently milled therefrom are readily obtained by maintaining the air-cleaned but internally contaminated wheat or other cereal grain for several hours in a circulating bath comprising a slightly warmed dilute aqueous solution of citric acid or of phosphoric acid, as shown in the examples and tables.

EXAMPLE 1

Ten pounds of air-cleaned hard red Kansas wheat (1963 crop) assaying 393 picocuries (pc=$1/10^{12}$ curies) of strontium-90 per kg. were placed in a perforated container that was then suspended in a circulating bath consisting of an 0.17-percent aqueous solution of citric acid, said bath preferably being maintained at about 110° F. and being completely replaced by fresh solution at hourly intervals. At the end of about 3½ hours the third replacement of citric acid solution was drained off, the wheat successively rinsed in water, centrifuged, then dried to a milling temper of 14-percent moisture, and milled in a conventional manner. The treated wheat prior to milling assayed 117 pc. of strontium-90 per kg., representing a reduction of 70.2 percent from the original untreated intact berry level of 393 pc./kg. Table 1 shows that the bran, shorts, clears, and patent wheat fractions from the milling of the untreated wheat berries assayed respectively 1570, 527, 49.4, and 34.3 pc./kg. and that parallel fractions from wheat treated according to the invention assayed respectively 338 pc., 174 pc., 41.8 pc., and 27.8 pc./kg. corresponding to respective reductions of 78.5 percent, 67.0 percent, 15.4 percent, and 19.0 percent, whereas only relatively poor reductions in the levels of strontium-90 were found in the milled products from wheat that had been washed in identical manner but in distilled water. Furthermore, in some instances the penetration of the distilled water apparently carries the radioactive particles more deeply into the kernels as indicated by the fact that while the counts were usually lowered somewhat, in some milled fractions they were actually higher than the strontium-90 level in the corresponding untreated fraction.

TABLE 1

Strontium-90 Values by AEC Health and Safety Lab Manual (1962); Method E.38-01

| | Air-cleaned, pc./kg. | H₂O washed, pc./kg. | 0.17 percent citric washed, pc./kg. | Percent reduction strontium-90 |
|---|---|---|---|---|
| Wheat berries | 393 | 408 | 117 | 70 |
| Bran | 1,570 | 1,520 | 338 | 78.5 |
| Shorts | 527 | 626 | 174 | 67 |
| Clear flour | 49.4 | 44 | 41.8 | 15.4 |
| Patent flour | 34.3 | 33 | 27.8 | 19 |

The employed washing period is not critical, and it is evident that somewhat shorter or longer periods may be selected in accordance with the desired extent of reduction in radioactivity. While it is believed that our invention will inherently provide rather similar reductions in the cesium 137 values, the levels of the latter were not determined since its relatively rapid elimination from the body distinctly lessens its biological importance.

EXAMPLE 2

Another 10-pound portion of the same air-cleaned wheat used in Example 1 was treated in precisely the same manner excepting that the aqueous solutions of citric acid had a concentration of 0.5 percent. The treated wheat assayed 105 pc./kg. (73.3% reduction); the bran assayed 300 pc./kg. (80.8% reduction); the shorts assayed 137 pc./kg. (74% reduction); the clears assayed 27 pc./kg. (45.3% reduction); and the patent flour assayed 26 pc./kg. of strontium-90 (24% reduction).

EXAMPLE 3

Example 1 was repeated with the exception that the bath was an 0.17 percent solution of phosphoric acid. The analyses found for the thusly treated wheat and wheat fractions are given in Table 2.

TABLE 2

|  | Strontium-90, pc./kg. | Percent reduction |
|---|---|---|
| Wheat berries | 113 | 71.5 |
| Bran | 328 | 79.2 |
| Shorts | 212 | 59.8 |
| Clear flour | 30.5 | 38.3 |
| Patent flour | 28.6 | 16.7 |

EXAMPLE 4

Example 3 was repeated excepting that the bath was an 0.5 percent solution of phophoric acid. Table 3 sets forth the results.

TABLE 3

|  | Strontium-90, pc./kg. | Percent reduction |
|---|---|---|
| Wheat berries | 100 | 74.6 |
| Bran | 258 | 83.7 |
| Shorts | 202 | 61.9 |
| Clear flour | 36.9 | 25.3 |
| Patent flour | 27.2 | 20.7 |

We claim:

1. A process for greatly reducing the strontium-90 contents of intact cereal grain berries and subsequently milled fractions thereof consisting of suspending the intact berries for about 3½ hours in a circulating aqueous solution containing about 0.17 percent of a member selected from the group consisting of citric acid and phosphoric acid, washing the thusly treated cereal grain berries in tap water, and drying the water-washed berries sufficiently for milling.

2. The process of claim 1 wherein the solution is that of citric acid, and the concentration of the acid therein is 0.17 percent.

3. The process of claim 1 wherein the solution is that of phosphoric acid, and the concentration of the acid therein is 0.17 percent.

References Cited

UNITED STATES PATENTS

| 2,930,699 | 3/1960 | Sollano et al. | 99—80 X |
| 3,264,113 | 8/1966 | Barta et al. | 99—80 |

FOREIGN PATENTS

| 3,471 | 8/1926 | Australia. |
| 771,378 | 4/1957 | Great Britain. |

A. LOUIS MONACELL, Primary Examiner

R. HOFFMAN, Assistant Examiner